(12) United States Patent
Chang et al.

(10) Patent No.: US 8,223,003 B2
(45) Date of Patent: Jul. 17, 2012

(54) SWINGING DEVICE AND APPARATUS FOR DETECTING ROTATING STATUS AND INFORMATION DISPLAYING DEVICE USING THE SAME

(75) Inventors: Pin Chang, Hsinchu (TW); Yu-Jen Wang, Taipei County (TW); Chien Li, Tainan County (TW); Chung-De Chen, Miaoli County (TW); Pei-Fen Wu, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 364 days.

(21) Appl. No.: 12/631,502

(22) Filed: Dec. 4, 2009

(65) Prior Publication Data

US 2011/0074563 A1   Mar. 31, 2011

(30) Foreign Application Priority Data

Sep. 30, 2009   (TW) ................. 98133136 A

(51) Int. Cl.
*B62J 3/00* (2006.01)
(52) U.S. Cl. ............ 340/432; 340/425.5; 340/438
(58) Field of Classification Search ............ 340/432
See application file for complete search history.

(56) References Cited

U.S. PATENT DOCUMENTS

| | | | |
|---|---|---|---|
| 3,753,000 A | 8/1973 | Newman | |
| 3,894,599 A | 7/1975 | Murray | |
| 4,559,462 A | 12/1985 | Hernandez-Badillo | |
| 4,677,328 A | 6/1987 | Kumakura | |
| 4,950,971 A | 8/1990 | Hegi et al. | |
| 5,455,485 A | 10/1995 | Kutter | |
| 5,461,269 A | 10/1995 | De Raucourt | |
| 5,590,946 A | 1/1997 | Jung | |
| 5,606,207 A | 2/1997 | Gotoh | |
| 5,707,215 A * | 1/1998 | Olney et al. .......... | 417/233 |
| 5,800,039 A | 9/1998 | Lee | |
| 5,828,145 A | 10/1998 | Nakamura | |

(Continued)

FOREIGN PATENT DOCUMENTS

CN   101725492 A   6/2010

OTHER PUBLICATIONS

China Patent Office Action issued on Mar. 12, 2012.

*Primary Examiner* — George Bugg
*Assistant Examiner* — Kerry McNally
(74) *Attorney, Agent, or Firm* — Morris Manning & Martin LLP; Tim Tingkang Xia, Esq.

(57) ABSTRACT

The present disclosure provides a swinging device having a swinging mechanism disposed on an energy provider, wherein volume and shape of the swinging mechanism and a distance between the swinging mechanism and the energy provider are adjusted so as to control the ratio of the distance and a characteristic value corresponding to the swinging mechanism in a specific range such that the swinging mechanism is capable of resonating with respect to the rotation of the energy provider. The swinging mechanism is capable of detecting the rotating frequency of the energy provider as well as combining with a display unit which is capable of displaying information with respect to the rotating status or displaying image patterns controlled according to the rotating status.

24 Claims, 12 Drawing Sheets

U.S. PATENT DOCUMENTS

| | | |
|---|---|---|
| 5,895,991 A | 4/1999 | Butz |
| 6,002,187 A | 12/1999 | Ohkura et al. |
| 6,016,022 A | 1/2000 | Cho |
| 6,016,101 A * | 1/2000 | Brown .......................... 340/432 |
| 6,072,386 A | 6/2000 | Yu |
| 6,492,963 B1 | 12/2002 | Hoch |
| 6,502,842 B2 | 1/2003 | Ko |
| 6,559,564 B1 | 5/2003 | Itou |
| 6,605,884 B2 | 8/2003 | Nishimoto |
| 6,703,716 B2 | 3/2004 | Chiu |
| 6,765,362 B2 | 7/2004 | Ta-Shuo |
| 6,789,926 B2 | 9/2004 | Chang |
| 6,924,569 B2 | 8/2005 | Endo et al. |
| 6,992,413 B2 | 1/2006 | Endo et al. |
| 7,042,123 B2 | 5/2006 | Kitamura et al. |
| 7,048,546 B2 | 5/2006 | Endo |
| 7,059,989 B2 | 6/2006 | Fukui |
| 7,199,500 B2 | 4/2007 | Yoshida |
| 7,275,844 B2 | 10/2007 | Watanabe |
| 7,288,865 B2 | 10/2007 | Tanaka et al. |
| 7,446,444 B2 | 11/2008 | Iteya et al. |

\* cited by examiner

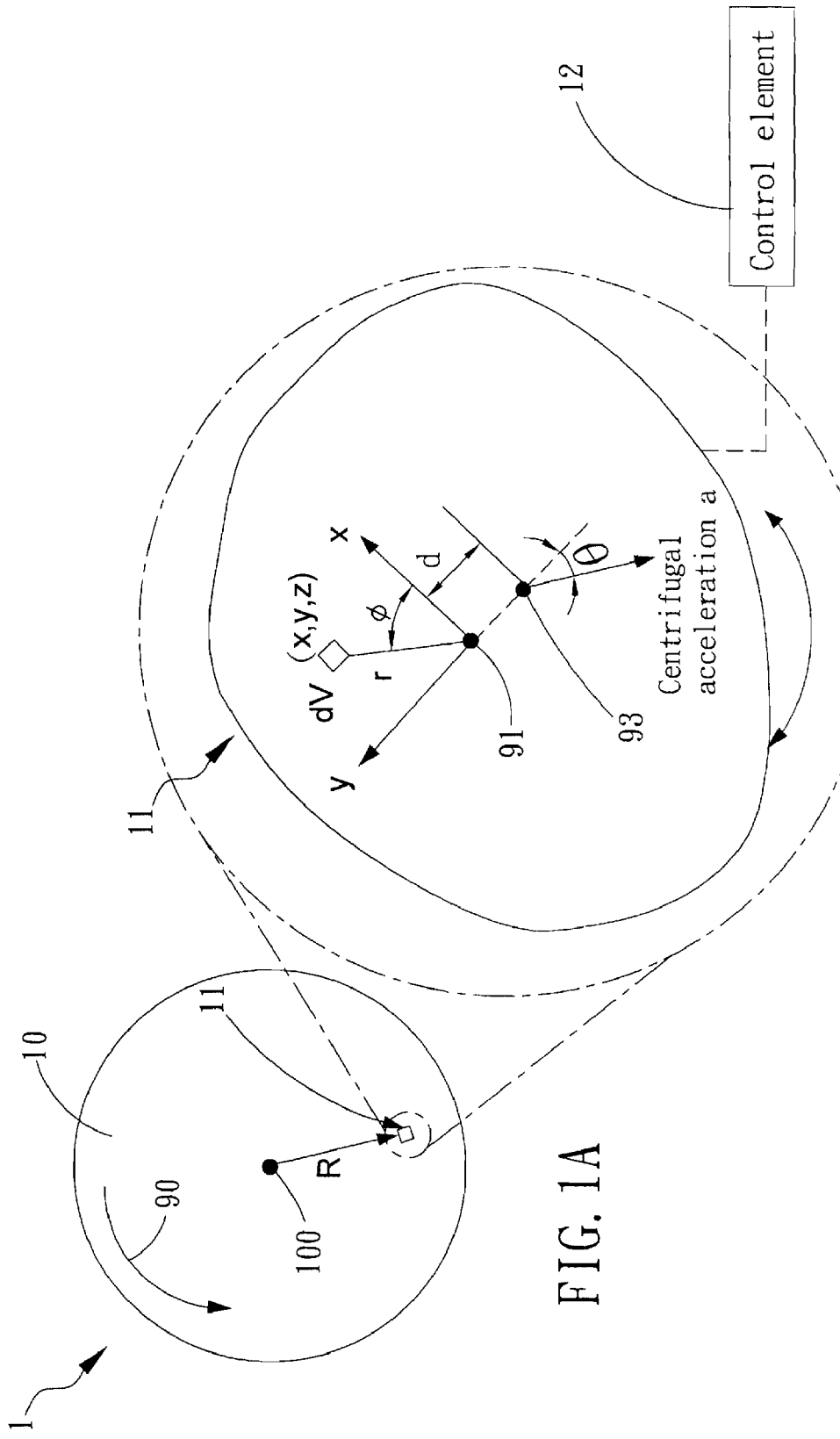

SWINGING DEVICE AND APPARATUS FOR DETECTING ROTATING STATUS AND INFORMATION DISPLAYING DEVICE USING THE SAME

TECHNICAL FIELD

The present disclosure relates to a resonance technology, and more particularly, to a swinging device capable of resonating in response to a rotation while simultaneously detecting the rotating status according to its swing resonating operation, as well as an apparatus for detecting rotating status and information display device using the same.

TECHNICAL BACKGROUND

As a result of pervasive environmental awareness, bicycle is no longer only being considered as a transportation tool, but is becoming a tool of recreation or exercise. With the recreational and/or competitive cycling continues to increase, the worldwide bicycle production set an all-time record in 2007. Over 130 million bikes were manufactured, topping the prior years by a growth rate of 3% to 5% every year. Accordingly, as the consequence of this popularity of bicycle riding, there are more and more various bicycle accessories, such as bicycle lights, coming out on the market. It is noted that the modern bicycle lights are no longer being restricted to those flash lamps for lighting and signal indication lamps for alerting, but also can be designed as LED lamps with specific patterns for mounting on bicycle wheels. Such modern bicycles with beautiful decoration of bicycle lights are becoming almost an icon of fashion statement for our modern lifestyle.

There are already many LED bicycle light devices currently available, such as those disclosed in U.S. Pat. No. 5,800,039, U.S. Pat. No. 6,072,386, U.S. Pat. No. 6,492,963, etc., in which the on/off of a LED light mounted on a bicycle wheel is controlled and timed by a controller while enabling the timing and the control of the controller to be operated according to the detection of a sensor which is arranged for detecting the positioning and speed of the bicycle wheel. Therefore, a stationary pattern can be formed by the persistence of vision effect from the movement of the LED light as it is mounted on the rotating bicycle wheel. It is noted that there are two key components must be included in each of the prior-art LED bicycle light device, which are the sensor and a power source as the sensor is used for detecting the positioning and speed of the bicycle wheel and the power source is used for powering the LED bicycle light device. As the difficulty to assemble a device can be increased with the increasing amount of components to be assembled in the manufacturing process, the overall cost and difficulty can be greatly reduced with respect to the manufacturing of the LED bicycle light device if there is a integrated component capable of acting as a power source and also detecting the positioning and speed of the bicycle wheel as the sensor. Moreover, the prior-art LED bicycle light devices usually employ battery as their power sources, that may not be environmental friendly since not only the process of battery manufacturing can produce many hazardous materials that can pollute the environment, but also the disposal of the used batteries may cause great problem to the environment protection. Thus, it is in need of a more environmental friendly power source for the LED bicycle light devices.

In addition, there are many energy harvesters for bicycles that are already available on the market, such as those disclosed in U.S. Pat. No. 6,002,187 and U.S. Pat. No. 7,275,844. The aforesaid energy harvester is designed to generate electricity utilizing the principle of electro-magnetic induction, which generally comprises: a magnet, mounted on the rim of a bicycle wheel; and a coil, fixedly secured on a bicycle frame. Thereby, when the bicycle starts to move and the bicycle wheel is being driven to rotate for bringing along the magnet to rotate therewith, there will be induction currents being generated each time when the rotating magnet moves passing through the coil. However, the induction current generated in the aforesaid manner can be used only by those devices fixedly mounted on the bicycle frame, such as a bike headlamp, since there is no way to transmit such induction current to those devices that are going to rotate with the rotation of the bicycle wheel, such as the abovementioned LED lights. Moreover, the use of the aforesaid energy harvesters for bicycles generally will cause resistance to the rotation of the bicycle wheel and thus a cyclist may have to pedal harder for riding a bike with such energy harvester.

As for those signal indication lamps for bicycles disclosed in U.S. Pat. No. 6,002,187 and U.S. Pat. No. 7,275,844 that are capable of demonstrating specific patterns, their on/off timings are controlled by a controller whereas the timing and the control of the controller is operated according to the detection of a sensor, and the whole operation is powered by batteries.

TECHNICAL SUMMARY

The present disclosure provides a swinging device, having a swinging mechanism disposed on an energy provider in a manner that the swinging frequency of the swinging mechanism is controlled to vary with the exercise frequency of the energy provider by adjusting the distance between the swinging mechanism and the energy provider for controlling the ratio of the distance and a characteristic value corresponding to the swinging mechanism, and thus enables the swinging device to resonate with respect to the exercise of the energy provider.

The present disclosure provide a rotating status detection apparatus, capable of enabling a swinging device to swing in a frequency consistent with a rotation frequency of a rotating object so as to be used for detecting the rotating status of the rotating object. The aforesaid rotating status detection apparatus is able to replace the conventional rotation speed sensor since it is advantageous in that: it is composed of less components comparing with those conventional rotation speed sensors and thus it is easily to assemble. In addition, as the rotating status detection apparatus is capable of harvesting the kinetic energy of the rotating object for converting the same into electricity, and the same time, capable of detecting the position and speed of the rotating object, it can replace the role of the conventional sensors and batteries in combination and thus it is more convenient both in usage and assembly. Since the rotating status detection apparatus is able to generate electricity from the rotation of the rotating object, no battery will be required to be used as power source so that it is environmental friendly.

The present disclosure provides an information displaying device, capable of generating electricity from the swing resonating of the swinging device, and the same time, capable of enabling its display element to display information relating to the rotating status, or images of specific patterns and/or alert signals.

It is noted that since both the rotating status detection apparatus and the information displaying device are designed to generate electricity on their own and are fixed on a wheel by the use of magnet and coil, they both are capable of transmitting electricity to a display element which are also fixedly mounted on the wheel. In addition, as the devices disclosed in the disclosure are designed to harvest energy to be used as power source from the gravity variation while they are rotating, the use of the aforesaid devices for bicycles generally will not cause resistance to the rotation of the bicycle wheel and thus a cyclist may not have to pedal harder for riding a bike with devices.

In an exemplary embodiment, the present disclosure provides a swinging device, comprising: an energy provider, capable of being driven to perform a rotation movement; and a swinging mechanism, featuring with a characteristic value and disposed on the energy provider at a specific distance away from the rotation axis of the energy provider for controlling the ratio of the specific distance and the characteristic value to fall in a specific range, and thus enable the swinging mechanism to resonate with respect to the rotation of the energy provider; wherein, the characteristic value is defined by the following equation:

$$L^* = \frac{I}{Md},$$

I is the mass moment of inertia;
M is the mass of the swinging mechanism; and
d is the specific distance.

In another exemplary embodiment, the present disclosure provides a rotating status detection apparatus, which comprises: an energy provider, capable of being driven to perform a rotation movement; a swinging mechanism, featuring with a characteristic value and disposed on the energy provider at a specific distance away from the rotation axis of the energy provider for controlling the ratio of the specific distance and the characteristic value to fall in a specific range, and thus enable the swinging mechanism to resonate with respect to the rotation of the energy provider while simultaneously generating an electric signal relating to the swinging frequency of the swinging mechanism; and a control element, capable of controlling obtaining a rotating status of the energy provider according to the electric signal; wherein, the characteristic value is defined by the following equation:

$$L^* = \frac{I}{Md};$$

I is the mass moment of inertia;
M is the mass of the swinging mechanism; and
d is the specific distance.

Furthermore, in another exemplary embodiment, the present disclosure provides an information displaying device with rotating status detecting ability, which comprises: an energy provider, capable of being driven to perform a rotation movement; a swinging mechanism, featuring with a characteristic value and disposed on the energy provider at a specific distance away from the rotation axis of the energy provider for controlling the ratio of the specific distance and the characteristic value to fall in a specific range, and thus enable the swinging mechanism to resonate with respect to the rotation of the energy provider while simultaneously generating an electric signal relating to the swinging frequency of the swinging mechanism; a control element, capable of obtaining a rotating status of the energy provider according to the electric signal, and thus generating a control signal accordingly; and a display element, electrically connected to the control element so as to display information corresponding to the control signal; wherein, the characteristic value is defined by the following equation:

$$L^* = \frac{I}{Md};$$

I is the mass moment of inertia;
M is the mass of the swinging mechanism; and
d is the specific distance.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1A is a schematic diagram showing a rotating status detection apparatus according to an embodiment of the present disclosure.

FIG. 1B is an enlarged diagram showing a swinging mechanism used in the rotating status detection apparatus of FIG. 1A.

DESCRIPTION OF THE EXEMPLARY EMBODIMENTS

Figure 2A:
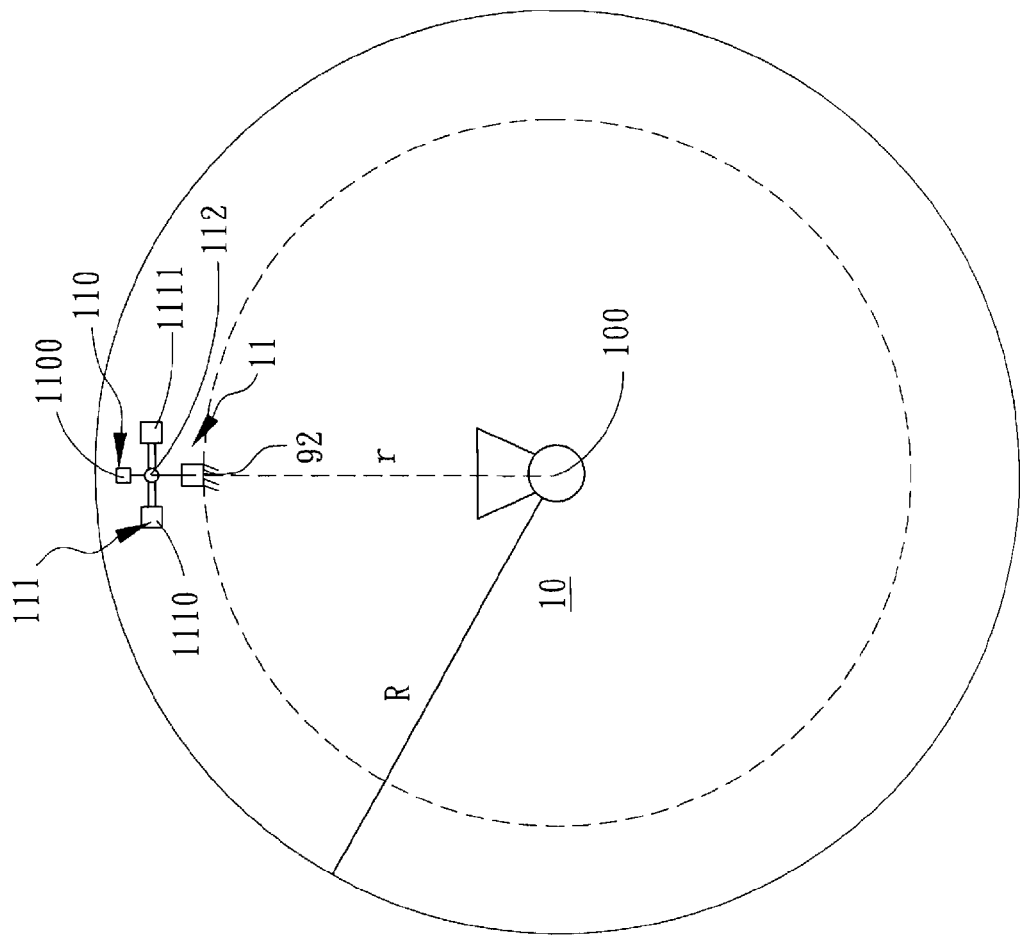
FIG. 2A is a schematic diagram showing a swinging mechanism as it is being disposed at a side of an energy provider according to an embodiment of the present disclosure.

For your esteemed members of reviewing committee to further understand and recognize the fulfilled functions and structural characteristics of the disclosure, several exemplary embodiments cooperating with detailed description are presented as the follows.

Please refer to FIG. 1A and FIG. 1B, which are a schematic diagram showing a rotating status detection apparatus according to an embodiment of the present disclosure and an enlarged diagram showing a swinging mechanism used in the rotating status detection apparatus of FIG. 1A. In this embodiment, the rotating status detection apparatus 1 comprises: an energy provider 10, a swinging mechanism 11 and a control element 12. The energy provider 10 can be driven to perform a rotation movement 90. However, in addition to the rotation movement 90, the energy provider 10 can simultaneously perform a translation movement so as to enable the same to roll accordingly. Therefore, the energy provider 10 can simply be a rotating object, or an object capable of rolling, such as a wheel. The swinging mechanism 11, being featured with a characteristic value, is disposed on the energy provider 10 in a manner that its swinging center 91 is located at a specific distance R away from the rotation axis 100 of the energy provider 10 for controlling the ratio of the distance R and the characteristic value to fall in a specific range, and thus enable the swinging mechanism 11 to resonate with respect to the rotation of the energy provider 10 while simultaneously generating an electric signal. It is noted that the characteristic value is defined by the following equation:

$$L^* = \frac{I}{Md};$$

wherein I is the mass moment of inertia;
M is the mass of the swinging mechanism; and
d is the specific distance.

In this embodiment, the mass moment of inertia is substantially an inertia resulting from the swinging of the swinging mechanism about its center of swinging. However, the mass moment of inertia is not limited to the one resulting from the center of swing, that it can be defined as an inertia resulting from any center selected by the user. In this embodiment, the electric signal is generated by the cooperation between a magnet and a coil, since the magnet is disposed on the swinging mechanism and the coil will cut through the magnetic lines emitted from the magnet while the swinging mechanism is swinging. The control element 12 is capable of obtaining a rotating status of the energy provider 10 according to the electric signal.

In FIG. 1A and FIG. 1B, the swinging mechanism 11 is coupled to an energy provider 10, and the energy provider 10 is rotating in an angular speed $\omega$ while its rotation center can be stationary or is performing a translation movement, so that the energy provider 10 can simply be a rotating object, or an object that is rolling. It is noted that when the swinging mechanism 11 is disposed at a distance R away from the rotation center of the energy provider 100, the swinging mechanism 11 is subjected to a centrifugal acceleration $\alpha$ defined as following:

$$\alpha = \omega^2 R. \qquad (1)$$

When the energy provider 10 is being driven to rotate, the gravity working on the swinging mechanism 11 is going to vary with the changing of its positioning and thus bring along the swinging mechanism 11 to swing about its swinging center 91. In FIG. 1A and FIG. 1B, the positioning of the swinging mechanism 11 and the energy provider 10 are defined in a Cartesian system of x-axis, y-axis and z-axis, whereas the Z-axis is arranged perpendicular to the rotation plane of the energy provider 10 and the mass center 93 of the swinging mechanism 11 is disposed at a position on the extending of -y direction while spacing the mass center 93 of the swinging mechanism 11 from its swinging center 91 by a distance d. Assuming the swinging mechanism 11 is made up of different materials of different densities, and is driven to swing by an angle $\theta$, according to the principle of vibration analysis, the movement of the swinging mechanism 11 is governed by an equation of motion as following:

$$I\ddot{\theta} + K\theta = -g \sin \omega t \int_V \rho r \sin \phi dV; \qquad (2)$$

wherein, V represents the volume of the swinging mechanism;
$\rho$ represents the density of the swinging mechanism;
t represents time; and
g represents the acceleration of gravity.

Thus, the mass moment of inertia I of the swinging mechanism 11 with respect to the swinging center 91 can be expressed as following:

$$I = \int_V r^2 \rho dV. \qquad (3)$$

In addition, the swinging mechanism 11 is further featured by an equivalent elastic constant K, which is defined by the following equation:

$$K = -\omega^2 R \int_V \rho r \sin\phi d V; \qquad (4)$$

wherein, $\omega$ represents an angular speed;
R represents the specific distance; and $$\int_V \rho r \sin \phi dV$$

is an equivalent constant.

From the foregoing equations (3) and (4), a nature swinging frequency $\omega_n$ can be obtained and defined as following:

$$\omega_n = \sqrt{\frac{K}{I}} = \omega \sqrt{\frac{R}{L^*}}; \qquad (5)$$

wherein, L* represents a characteristic value.

It is noted that the aforesaid characteristic value L* is defined by the following equation:

$$L^* = \frac{I}{Md}; \quad (6)$$

wherein I is the mass moment of inertia of the swinging mechanism with respect to the swinging center;
M is the mass of the swinging mechanism; and
d is the specific distance.

In this embodiment, the specific distance is the distance measured between the mass center of the swinging mechanism and the swinging center thereof According to the principle of resonance in vibration analysis, when the angular velocity of the energy provider 10 that is rotating, i.e. the rotation frequency of the energy provider 10, approaches the nature frequency of the swinging mechanism 11, the swinging mechanism 11 is going to resonant. That is, a resonance effect will occur when the following situation occur, i.e.

$$L^* \cong R. \quad (7)$$

Therefore, it is possible to selected a specific swinging mechanism with respect to its feature parameters in size, density and shape, etc., for enabling $\omega_n \cong \omega$, i.e. by selecting a specific swinging mechanism with respect to its feature parameters in size, density and shape, etc., the movement of the energy provider will cause the specifically selected swinging mechanism to resonant. In this embodiment, the ratio of the specific distance R and the characteristic value L* is adjusted to fall in a specific range capable of enabling the swinging mechanism to resonant, For clarity, the specific range may vary with the varying of its swinging center with respect to the Cartesian system used for defining the positioning of the same. For instance, in the Cartesian system defined in FIG. 1 whereas the swinging center 91 is located at the extending of −y direction, it is noted that $$Md = -\int_V \rho r \sin\phi dV$$

and thus the resulting specific range is a range between 0.1 and 10, as following:

$$0.1 < \frac{R}{L^*} < 10. \quad (8)$$

The defining of a Cartesian system for positioning the winging center at the extending of −y direction is only used for illustration, and thus the present disclosure is not limited thereby whereas the aforesaid equation (8) is allowed to varies with the variation of the defining of the Cartesian system.

When the swinging mechanism 11 is enabled to swing with the rotation of the energy provider 10, it is known from the equation (2) that the swinging mechanism 11 will swing in a swinging frequency consistent with the rotation frequency of the energy provider 10, and thus, it is possible to acquire the rotating status of the energy provider 10 from the measuring of the swinging frequency of the swinging mechanism 11, whereas the rotating status is a measurement selected from the group consisting of: rotation speed and rotation angle. When the energy provider 10 is driven to roll, its translation speed, positioning and distance of rolling can be obtained from a calculation basing upon the acquired rotating status.

Please refer to FIG. 2A, which is a schematic diagram showing a swinging mechanism as it is being disposed at a side of an energy provider according to an embodiment of the present disclosure. In this embodiment, the swinging mechanism 11 further comprises a swing element 110 and a weight stack 111. The swing element 110 is disposed on the energy provider 10 at a position 92 for enabling the same to swing about a swinging center 112 while disposing the swinging center 112 at a specific distance r away from the rotation axis 100 of the energy provider 10; and the weight stack 111 coupled to the swing element 110 for enabling the swinging frequency of the swinging mechanism 11 to vary with the variation of the frequency of energy released from the energy provider 10.

Figure 2B:
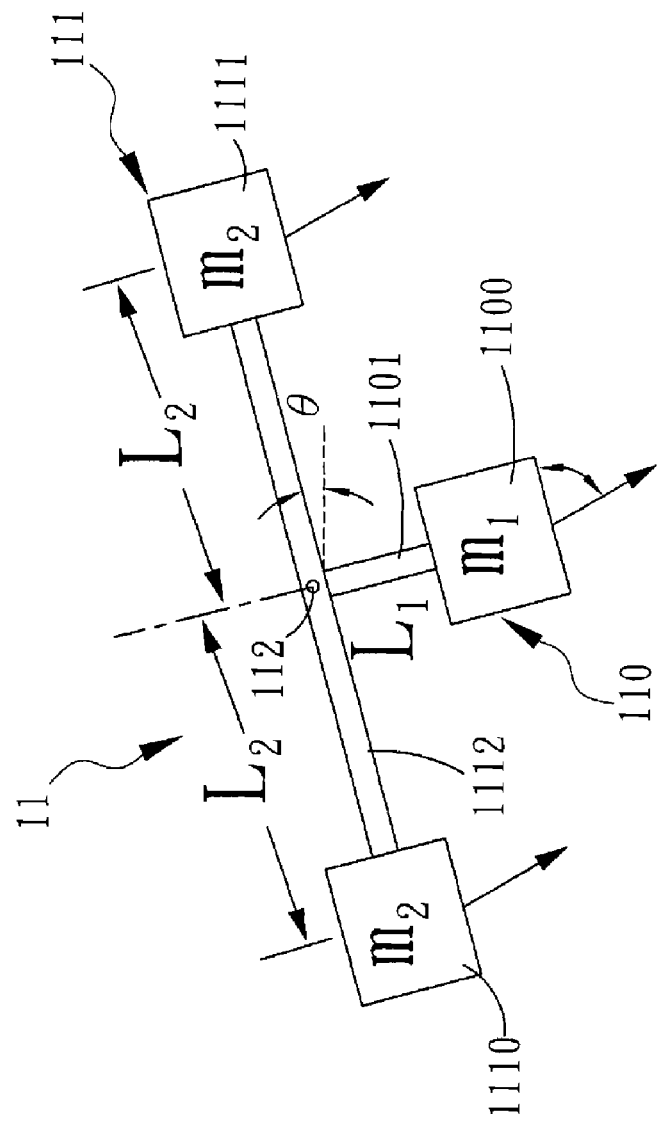
FIG. 2B is an enlarged diagram showing the swinging mechanism of FIG. 2A.

Please refer to FIG. 2B, which is an enlarged diagram showing the swinging mechanism of FIG. 2A. In FIG. 2B, the swing element 110 is composed of a mass 1100 and a rod 1101, in which the rod 1101 is connected to the swinging center 112 by an end thereof while enabling another end thereof to coupled with the mass 1100. It is noted that the mass 1100 can be a magnetic object, a non-magnetic object, or a structure composed of metal and magnetic materials. In this embodiment, the weight stack 111 is composed of a pair of masses 1110, 1111 and a rod 1112, in which the center of the rod 1112 is connected to the swinging center 112 while enabling the pair of masses 1110, 1111 to coupled with the two ends of the rod 1112 in respective.

Basing on vibration analysis, the movement of the system shown in FIG. 2B is governed by the following equation:

$$[m_1L_1^2 + 2m_2L_2^2]\ddot{\theta} + m_1\alpha L_1\theta = m_1L_1g\sin\omega t \quad (9)$$

wherein, $m_1$ and $m_2$ represent respectively the masses 1100 and 1111;
$L_1$ represents the length of the rod 1101;
$L_2$ represents a half of the length of the rod 1112; and
$\theta$ represents a swinging angle of the swinging mechanism 11.

During the rotation of the energy provider 10, the centripetal force acting on the swinging mechanism 11 is expressed as following:

$$\alpha = \omega^2 r; \quad (10)$$

wherein, $\alpha$ represent centripetal acceleration;
r is the distance measured between the swinging center 112 and the rotation axis 100 of the energy provider 10; and
$\omega$ is the angular speed or rotation frequency of the energy provider 10 while the same is rotating or rolling.

Accordingly, from equations (9) and (10), the nature frequency $\omega_n$ of the swinging mechanism 11 can be obtained as following:

$$\omega_n = \sqrt{\frac{m_1 a L_1}{m_1 L_1^2 + 2m_2 L_2^2}} = \omega\sqrt{\frac{r}{L^*}} \quad (11)$$

$$\text{wherein } L^* = \frac{L_1^2 + 2\frac{m_2}{m_1}L_2^2}{L_1} \quad (12)$$

Figure 2C:
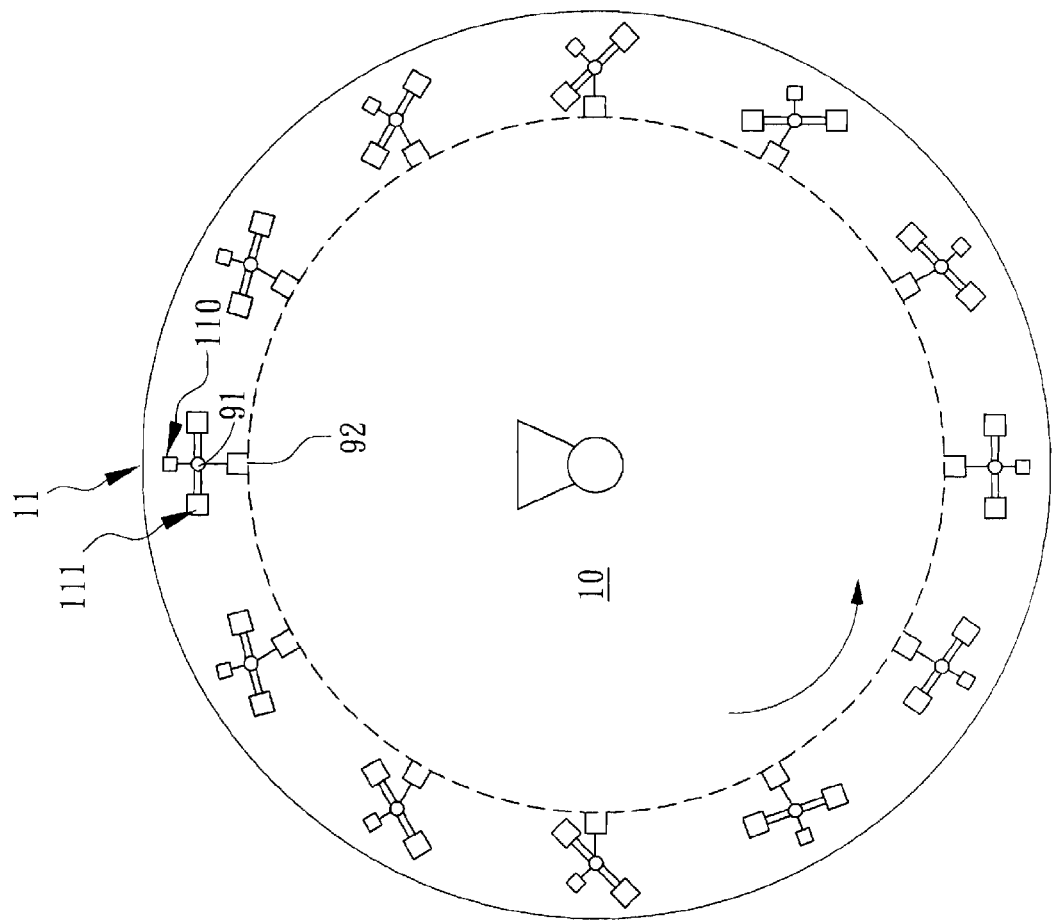
FIG. 2C is a schematic diagram showing how the swinging mechanism is swinging with the rotation of the energy provider according to an embodiment of the present disclosure.

It is noted that $\omega_n$ represents the nature frequency of the swinging mechanism 11 and $\omega$ represents the angular speed or rotation frequency of the energy provider 10 while the same is rotating or rolling. Moreover, from equations (11) and (12), the relationship between $m_1$, $m_2$, $L_1$, and $L_2$ can be illustrated. By the arrangement of the weight stack 111, the centrifugal force resulting from the rotation of the energy provider 10 will cause the nature frequency $\omega_n$ of the swinging mechanism 11 to modulated and varied with the varying of the rotation frequency ω of the energy provider 10, i.e. the nature frequency $\omega_n$ of the swinging mechanism 11 will increase with the increasing of the rotation frequency ω of the energy provider 10, and vice versa. Please refer to FIG. 2C, which is a schematic diagram showing how the swinging mechanism is swinging with the rotation of the energy provider according to an embodiment of the present disclosure. When the energy provider 10 is rotating in counterclockwisely, the swing element 110 and the weight stack 111 of the swinging mechanism 11 disposed on the energy provider 10 at the position 92 are going to be driven to swing according to the rotation, by that the swinging mechanisms 11 located at positions other than the position 92 are used for illustrating the swinging of the swing element 110 and the weight stack 111 in the swinging mechanism 11 with respect to different timings during the rotation of the energy provider 10. It is noted that the swinging mechanism 11 will finish a period of swinging in correspondence to one revolution of the rotating energy provider 10, and thus it is certain that the swinging mechanism 11 will swing in a swinging frequency consistent with the rotation frequency of the energy provider 10.

Figure 3:
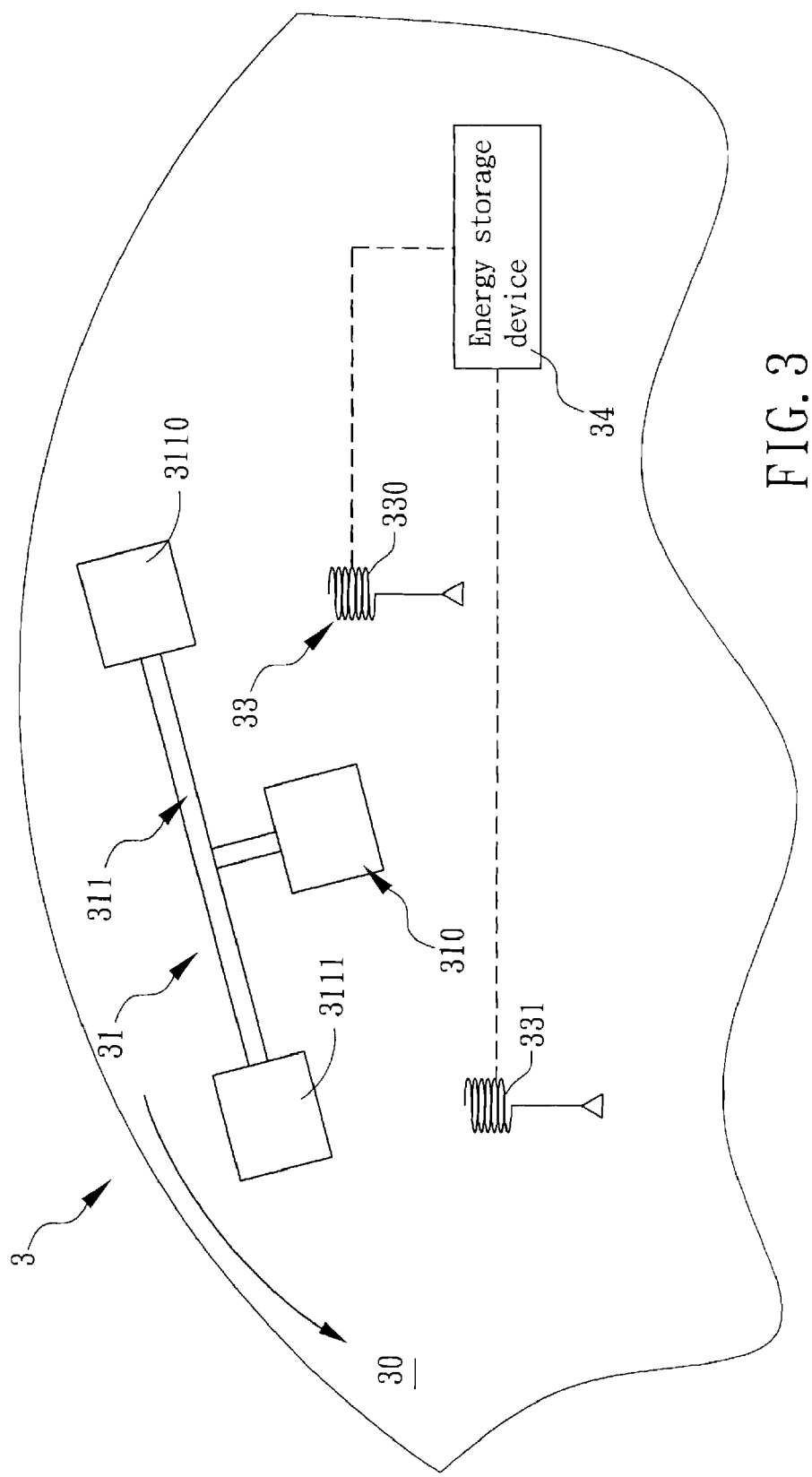
FIG. 3 is a schematic diagram showing a rotating status detection apparatus according to another embodiment of the present disclosure.

Please refer to FIG. 3, which is a schematic diagram showing a rotating status detection apparatus according to another embodiment of the present disclosure. In this embodiment, the rotating status detection apparatus 3 comprises: an energy provider 30; a swinging mechanism 31; and an induction coil element 33, disposed at a position for enabling the same to generate an induction current with correspondence to the swinging of the swinging mechanism 31. In FIG. 3, the swinging mechanism 31 is composed of a swing element 310 and a weight stack 311, which are almost the same as those disclosed in FIG. 2B, but are different in that: the mass pair 3110, 3111 of the weight stack 311 are magnetic masses that are capable of providing a magnetic field. Moreover, the induction coil element 33 is further composed of two coils at positions corresponding to the magnetic masses 3110, 3111 in respective. Thereby, when the energy provider 30 is rotating, the magnetic swinging mechanism 31 will resonant accordingly while enabling the magnetic masses 3110, 3111 to swing relative to their corresponding coils 330, 331 so as to generate induction currents. Thereafter, the generated induction currents will be transmitted to an energy storage device 34 for storage as the energy storage device 34 is electrically connected to the induction coil element 33.

Figure 4A:
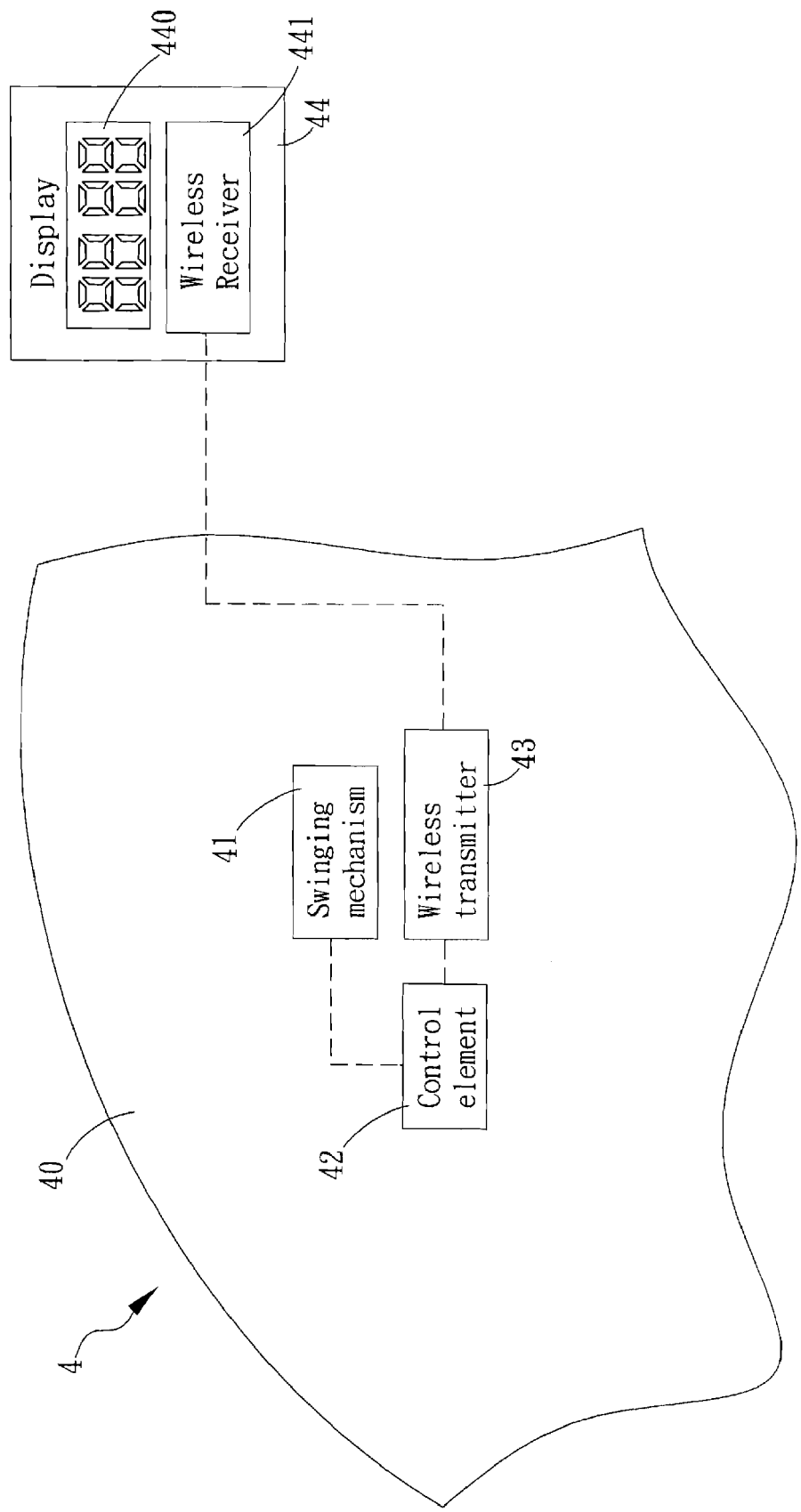
FIG. 4A is a schematic diagram showing an information displaying device according to a first embodiment of the present disclosure.

Please refer to FIG. 4A, which is a schematic diagram showing an information displaying device according to a first embodiment of the present disclosure. In FIG. 4A, the information displaying device 4 comprises: an energy provider 40; a swinging mechanism 41; a control element 42; a wireless transmitter 43; and a display element 44. In this embodiment, the energy provider 40, capable of being driven to rotate or roll, is a bicycle wheel. The swinging mechanism 41, featuring with a characteristic value, is disposed on the energy provider 40 at a specific distance away from the rotation axis of the energy provider 40 for controlling the ratio of the specific distance and the characteristic value to fall in a specific range, and thus enable the swinging mechanism 41 to resonate with respect to the rotation of the energy provider 40 while simultaneously generating an electric signal relating to the swinging frequency of the swinging mechanism 41. The control element 42 is capable of obtaining a rotating status of the energy provider 40 according to the electric signal, and thus generating a control signal accordingly. The display element 44, being electrically connected to the control element 42 so as to display information corresponding to the control signal, is further comprised of: a displayer 440 and a wireless receiver 441. In this embodiment, the displayer 440 can be a LED displaying device or a LCD displaying device.

Figure 4B:
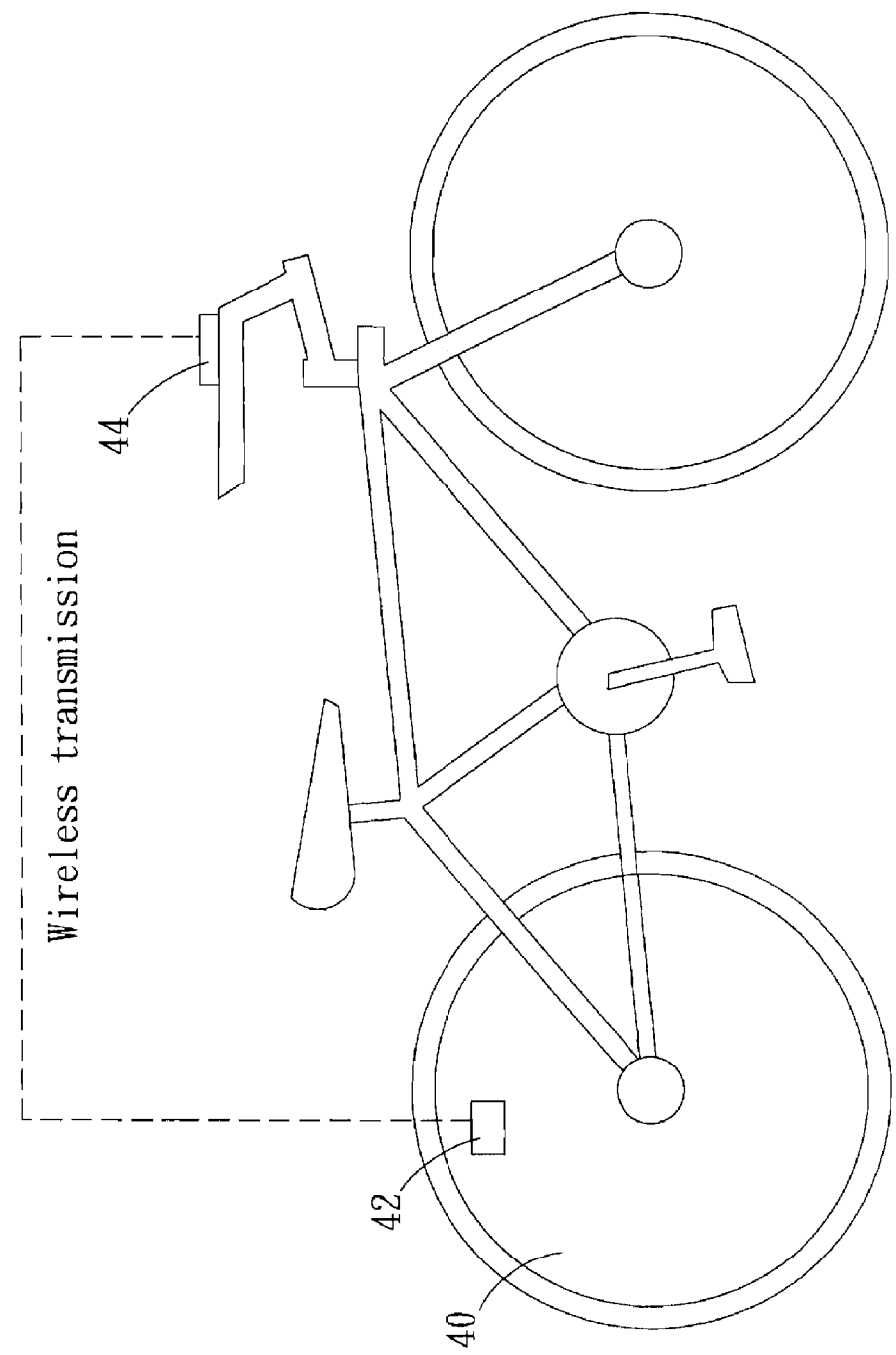
FIG. 4B is a schematic diagram showing a display element as the same is constructed inside the information displaying device of FIG. 4A.

Please refer to FIG. 4B, which is a schematic diagram showing a display element as the same is constructed inside the information displaying device of FIG. 4A. In FIG. 4B, the display element 44 is a bicycle speed meter that is mounted on the handle of the bike in this embodiment, but is not limited thereby. According to the foregoing description, the control element 42 is able to perform a calculation basing upon the electric signal resulting from the resonance of swinging mechanism 41 with respect to the rotating wheel 40, by that the control element 42 can obtain the rotation frequency ω of the wheel 40, and by multiplying the rotation frequency ω by a time period, a distance regarding to how far the bicycle is traveled in this time period can be calculated. Then, with the travel distance and the time period for the bicycle to travel the distance, the speed of the bicycle can be obtained. That is, the information relating to the rotation frequency, travel distance and bicycle speed can be acquired from the calculation of the control element 42, and then, such information is transmitted wirelessly by the wireless transmitter 43 to the wireless receiver 441 in the display element 44, where it is processed to be display on the displayer 440 for informing the biker with the current riding status.

Figure 4C:
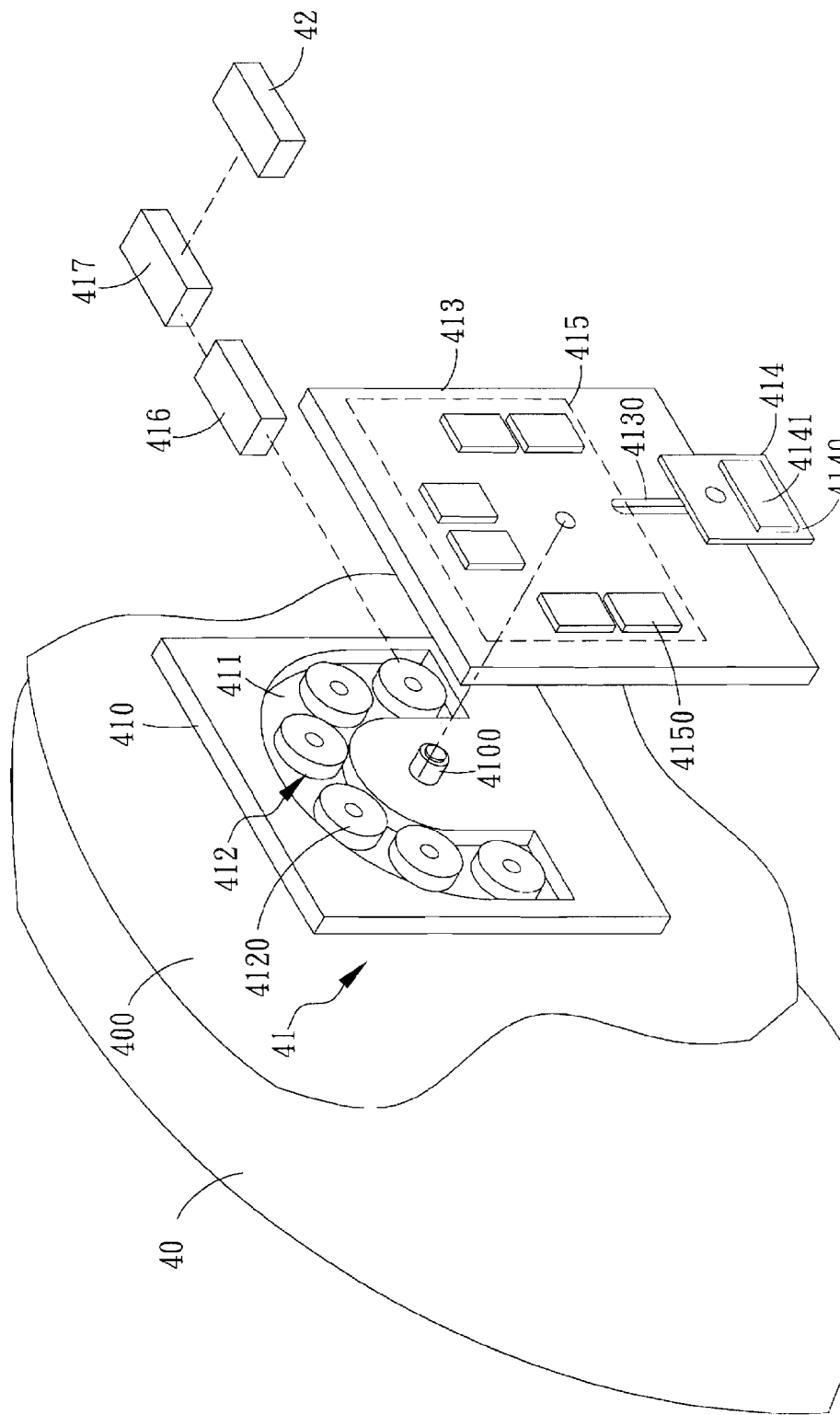
FIG. 4C is a schematic diagram showing a swinging mechanism used in the information displaying device of FIG. 4A.

Please refer to FIG. 4C, which is a schematic diagram showing a swinging mechanism used in the information displaying device of FIG. 4A. In FIG. 4C, the power required for the control element to perform the calculation is provided by a power unit which can be a battery or a power generator capable of harvesting the kinetic energy resulting from the pedaling of a biker riding the bicycle for generating electricity. In this embodiment, the power required is generated from the swinging of the swinging mechanism. According to the forgoing description, the characteristic value of the swinging mechanism can be controlled and adjusted for enabling the ratio of the specific distance and the characteristic value to fall in a specific range, and thus enable the swinging mechanism to resonate with maximum amplitude in responsive to the rotation of the energy provider, whereas the characteristic value is defined by the following equation:

$$L^* = \frac{I}{Md}.$$

The use of the swinging of the swinging mechanism to produce electricity so as to be used as power source is considered the characteristic of the embodiment shown in FIG. 4C. In FIG. 4C, the swinging mechanism 41 has a first plate 410, which is fixedly mounted on the frame 400 of a wheel 40. The first plate is further configured with a rotation axis 4100 and a groove 411, whereas the groove is provided for an induction coil element 412 composed of a plurality of coils 4120 to be received therein. Moreover, the swinging mechanism 41 also has a second plate 413, which is pivotally coupled to the rotation axis 4100, and is provided for a swing element 414 and a weight stack 415 to fit there on. As shown in FIG. 4C, the swing element 414 includes a panel 4140 that is provided for a mass 4141 to fit thereon. As the panel 4140 is fixedly secured on the second plate 413, the second plate 413 is further configured with a chute 4130 that is provided for the panel 4140 to slide inside the chute 4130 so as to adjust the distance between the swing element 414 and the rotation axis 4100, and thus changing the parameters relating to the swinging of the swing element 414 by changing the positioning of the panel 4140. In addition, the weight stack 415, being composed of a plurality of magnetic masses 4150, is disposed at a position corresponding to the plural coils 4120 on the first plate 410. Thereby, as soon as the wheel is being driven to rotate, the second plate 413 of the swinging mechanism 41 will start swinging centering about the rotation axis 4100, and during the swinging, induction currents can be generated between the magnetic masses 4150 and the coils 4120. It is noted that the induction coil element 412 is further connected to a rectifier 416 and an energy storage device 417, and thus the control element 42 can receive power directly from the energy storage device 417.

Figure 5A:
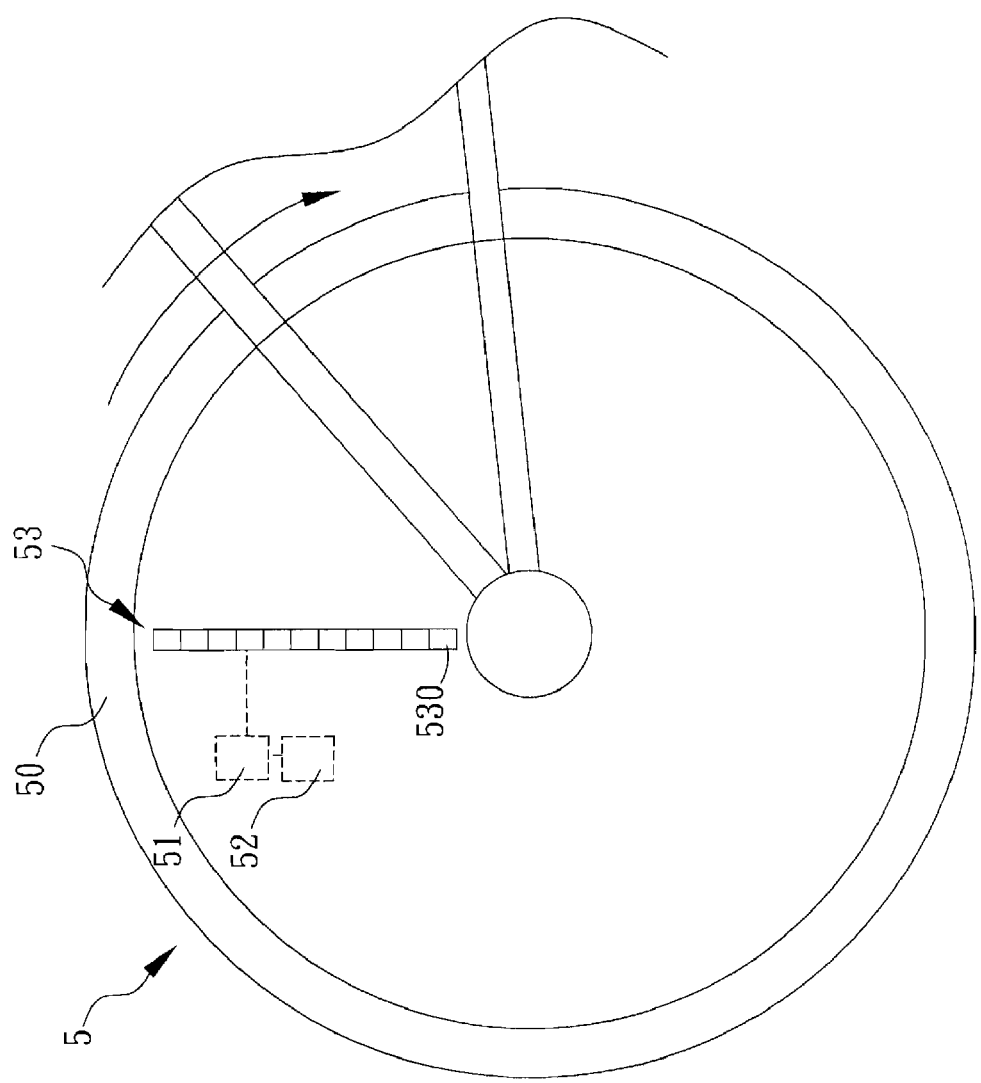
FIG. 5A is a schematic diagram showing an information displaying device according to a second embodiment of the present disclosure.

Please refer to FIG. 5A, which is a schematic diagram showing an information displaying device according to a second embodiment of the present disclosure. In this embodiment, the information displaying device 5 comprises: an energy provider 50; a swinging mechanism 51; a control element 52 and a display element 53. It is noted that the energy provider 50, the swinging mechanism 51 and the control element 52 are all constructed the same as those disclosed in FIG. 4A to FIG. 4C, but the different between the embodiment of FIG. 5A and that of FIG. 4A is that: the display element 53 of FIG. 5A is substantially a light-emitting module, being disposed on the energy provider 50 and configured with at least one row of light-emitting units 530. In this embodiment, each light-emitting unit 530 is a light-emitting diode, but is not limited thereby. Similarly, the rotation of the energy provider 50, which is a bicycle wheel in this embodiment, can cause the swinging mechanism 51 to resonant therewith so as to generate an electric signal accordingly. The control element 52 can detect the electric signal so as to calculate and obtain information relating to the rotation frequency of the bicycle wheel, and more, issue a control signal basing upon the detected information for controlling the light-emitting units 530 specified in the control signal to radiate light so as to enable the display element 53 to show specific image patterns or messages by the persistence of vision effect while the light-emitting units 530 are being brought along to rotate with the rotating energy provider 50.

Figure 5B:
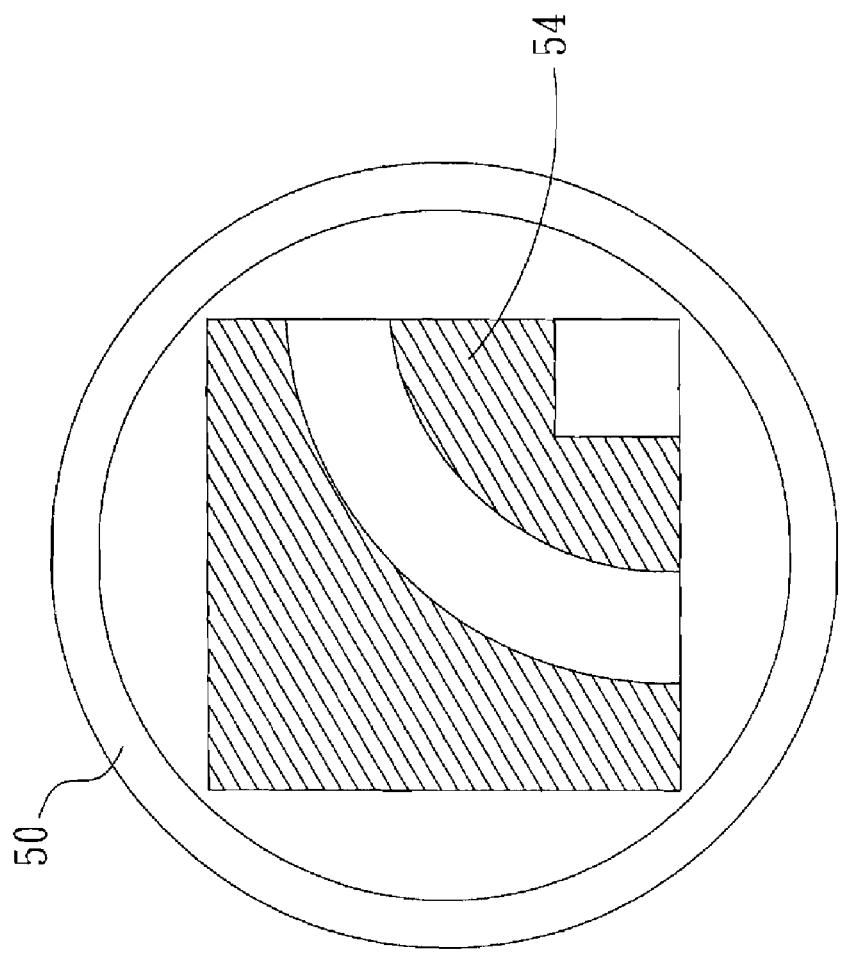
FIG. 5B is a schematic diagram showing a specific pattern being displayed on the display element of the present disclosure.
Figure 5C:
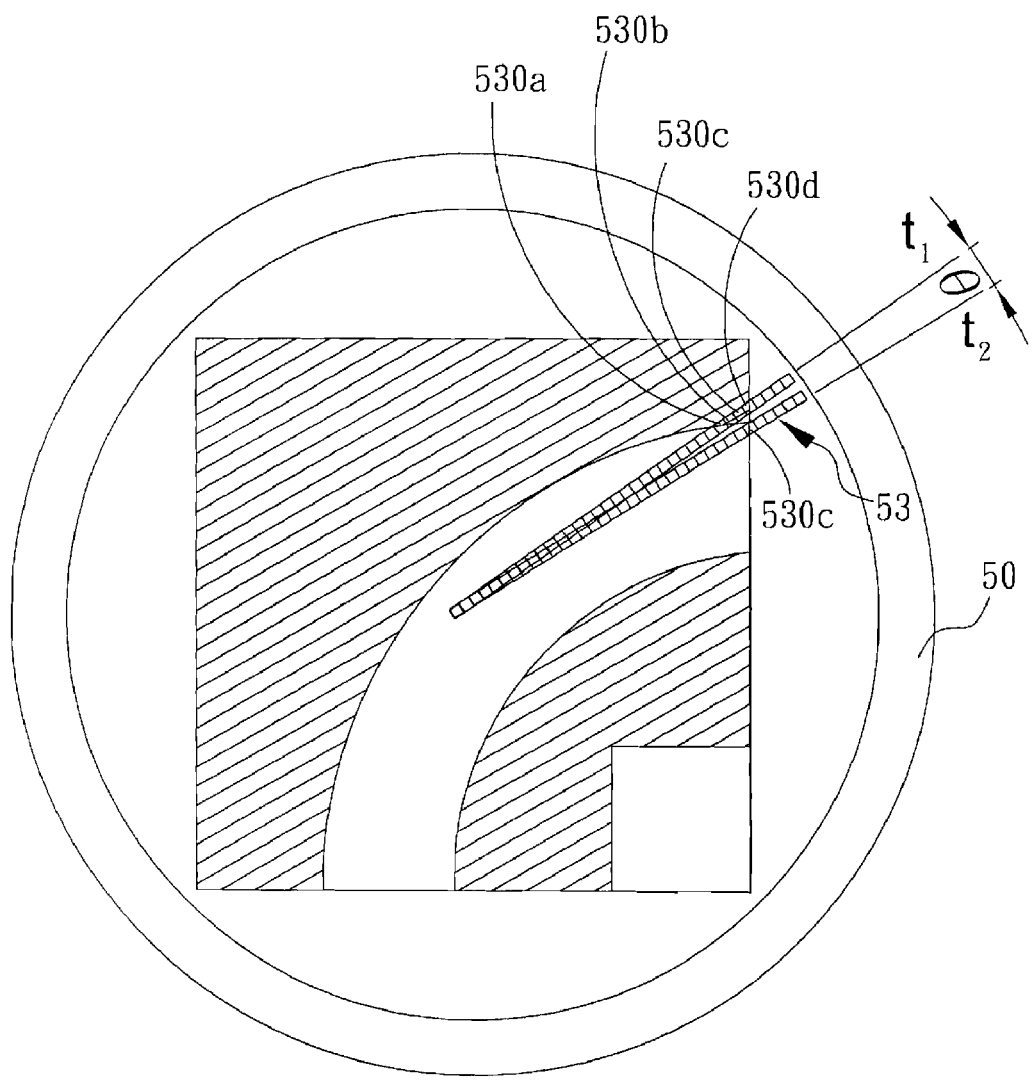
FIG. 5C is a schematic diagram showing how the light-emitting units in the display element are timed for displaying the specific pattern.

For instance, it is capable of producing a pattern 54 shown in FIG. 5B simply by the use of only one row of light-emitting unit. Please refer to FIG. 5C, which is a schematic diagram showing how the light-emitting units in the display element are timed for displaying the specific pattern. As the display element 53 will be brought along to rotate with the rotation of the energy provider 50, the image pattern of FIG. 5B is generated by enabling the light-emitting units 530a~530d to radiate at the time $t_1$, while enabling only the light-emitting unit 530c to radiate at time $t_2$ and turning off the other light-emitting units. Since the rotating status of the bicycle wheel 50 is detected by the swinging mechanism 51 and transmitted to the control element 52 for processing during the rotation of the wheel 50, the control signal can be issued by the control element 52 basing upon the rotating status for controlling light-emitting units 530 specified in the control signal to radiate light so as to show a spatially stationary pattern by the persistence of vision effect while the light-emitting units 530 are being brought along to rotate and thus scan through a plane defined in space.

Figure 5D:
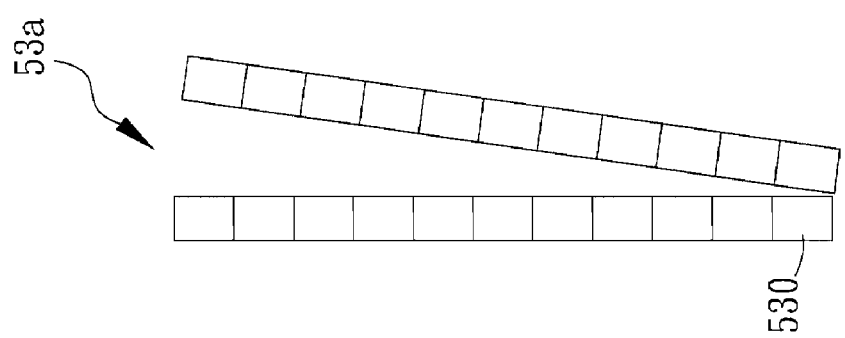
FIG. 5D is a schematic diagram showing a display element as the display element is configured with two rows of light-emitting units.

It is noted that the embodiment of FIG. 5A can be powered by any means, which can be powered by batteries, by harvesting the kinetic energy resulting from the pedaling of a biker riding the bicycle for generating electricity, or by harvesting the kinetic energy from the rotating bicycle wheel, but is not limited thereby. It is noted that the embodiment of FIG. 5A can be powered by the swinging of the swinging mechanism, as the swinging mechanism shown in FIG. 4C with similar structure and thus is not described further herein. In addition, the display element can be composed of more than two rows of light-emitting units, as the display element 53a shown in FIG. 5D. With more than two rows of light-emitting units, stationary image pattern can still be formed even when the wheel rotates in slow speed. It is noted that the rows of the light-emitting units 530 may be formed in a V-shape arrangement, or a Y-shape arrangement, but is not limited thereby and can be determined at will. Moreover, the use of bicycle wheel in the aforesaid embodiments is only used for illustration, the present disclosure can be applied in motorcycles, cars, or other devices with rotating components, that is able to produce specific patterns on the rotating components.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A rotating status detection apparatus, comprising:
an energy provider, capable of being driven to perform a rotation movement;
a swinging mechanism, featuring with a characteristic value and disposed on the energy provider at a specific distance away from the rotation axis of the energy provider for controlling the ratio of the specific distance and the characteristic value to fall in a specific range, and thus enable the swinging mechanism to resonate with respect to the rotation of the energy provider while simultaneously generating an electric signal relating to the swinging frequency of the swinging mechanism; and
a control element, capable of obtaining a rotating status of the energy provider according to the electric signal;
wherein, the characteristic value is defined by the following equation:

$$L^* = \frac{I}{Md};$$

I is the mass moment of inertia;
M is the mass of the swinging mechanism; and
d is the specific distance.

2. The rotating status detection apparatus of claim 1, wherein the energy provider is a wheel.

3. The rotating status detection apparatus of claim 1, wherein the swinging mechanism further comprises:
a swing element, disposed on the energy provider for swinging about a swinging center while disposing the swinging center at a specific distance away from the rotation axis of the energy provider; and
a weight stack, coupled to the swing element for enabling the swinging frequency of the swinging mechanism to vary with the variation of the frequency of energy released from the energy provider.

4. The rotating status detection apparatus of claim 3, wherein the swing element is further configured with at least one mass.

5. The rotating status detection apparatus of claim 3, wherein the weight stack is further configured with at least one mass.

6. The rotating status detection apparatus of claim 1, wherein the rotating status is a measurement selected from the group consisting of: rotation speed and rotation angle.

7. The rotating status detection apparatus of claim 1, wherein the swinging mechanism is a magnetic swinging mechanism.

8. The rotating status detection apparatus of claim 7, wherein the magnetic swinging mechanism further comprises:
a magnetic swing element, disposed on the energy provider for swinging about a swinging center while disposing the swinging center at a specific distance away from the rotation axis of the energy provider; and
a magnetic weight stack, coupled to the swing element for enabling the swinging frequency of the swinging mechanism to vary with the variation of the frequency of energy released from the energy provider.

9. The rotating status detection apparatus of claim 7, further comprising:
an induction coil, disposed at a position corresponding to the magnetic swing mechanism for generating an induction current in response to the swinging of the magnetic swing mechanism.

10. The rotating status detection apparatus of claim 9, further comprising:
an energy storage device, coupled to the induction coil for storing the electricity generated from the induction coil.

11. An information displaying device with rotating status detecting ability, comprising:
an energy provider, capable of being driven to perform a rotation movement;
a swinging mechanism, featuring with a characteristic value and disposed on the energy provider at a specific distance away from the rotation axis of the energy provider for controlling the ratio of the specific distance and the characteristic value to fall in a specific range, and thus enable the swinging mechanism to resonate with respect to the rotation of the energy provider while simultaneously generating an electric signal relating to the swinging frequency of the swinging mechanism;
a control element, capable of obtaining a rotating status of the energy provider according to the electric signal, and thus generating a control signal accordingly; and
a display element, electrically connected to the control element so as to display information corresponding to the control signal;
wherein, the characteristic value is defined by the following equation:

$$L^* = \frac{I}{Md};$$

I is the mass moment of inertia;
M is the mass of the swinging mechanism; and
d is the specific distance.

12. The information displaying device of claim 11, wherein the energy provider is a wheel.

13. The information displaying device of claim 11, wherein the swinging mechanism further comprises:
a swing element, disposed on the energy provider for swinging about a swinging center while disposing the swinging center at a specific distance away from the rotation axis of the energy provider; and
a weight stack, coupled to the swing element for enabling the swinging frequency of the swinging mechanism to vary with the variation of the frequency of energy released from the energy provider.

14. The information displaying device of claim 13, wherein the swing element is further configured with at least one mass.

15. The information displaying device of claim 13, wherein the weight stack is further configured with at least one mass.

16. The information displaying device of claim 11, wherein the rotating status is a measurement selected from the group consisting of: rotation speed and rotation angle.

17. The information displaying device of claim 11, wherein the swinging mechanism is a magnetic swinging mechanism.

18. The information displaying device of claim 17, wherein the magnetic swinging mechanism further comprises:
a magnetic swing element, disposed on the energy provider for swinging about a swinging center while disposing the swinging center at a specific distance away from the rotation axis of the energy provider; and
a magnetic weight stack, coupled to the swing element for enabling the swinging frequency of the swinging mechanism to vary with the variation of the frequency of energy released from the energy provider.

19. The information displaying device of claim 17, further comprising:
an induction coil, disposed at a position corresponding to the magnetic swing mechanism for generating an induction current in response to the swinging of the magnetic swing mechanism.

20. The information displaying device of claim 19, further comprising:
an energy storage device, coupled to the induction coil for storing the electricity generated from the induction coil.

21. The information displaying device of claim 11, wherein the display element is a light-emitting module, being disposed on the energy provider and configured with at least one row of light-emitting units.

22. The information displaying device of claim 21, wherein each light-emitting unit is a light-emitting diode.

23. The information displaying device of claim 22, wherein the control signal is issued basing upon the rotating status and is used for controlling certain light-emitting units specified in the control signal to radiate light so as to produce the persistence of vision effect while the light-emitting units are being brought along to rotate with the rotating energy provider.

24. The information displaying device of claim 11, wherein the control signal, being issued basing upon the rotating status, is transmitted to the display element by the use of a wireless transmitter as the wireless transmitter is electrically connected to the control element; and the display element is enabled to receive the control signal through a wireless receiver so as to react accordingly.

* * * * *